D. KRAUS.
MOTOR VEHICLE.
APPLICATION FILED JULY 16, 1917.

1,347,279.

Patented July 20, 1920.

Inventor
David Kraus
By his Attorney
Charles H. Wiren

UNITED STATES PATENT OFFICE.

DAVID KRAUS, OF NEW YORK, N. Y.

MOTOR-VEHICLE.

1,347,279.  Specification of Letters Patent.  Patented July 20, 1920.

Application filed July 16, 1917. Serial No. 180,765.

*To all whom it may concern:*

Be it known that I, DAVID KRAUS, residing at New York, in the county and State of New York, have invented certain new and useful Improvements in Motor-Vehicles, of which the following is a specification.

This invention relates to improvements in propulsion means for motor vehicles, such as automobiles, motor trucks, aeroplanes, or in fact any vehicle wherein liquid fuel is utilized.

One of the objects of the invention is to provide improved motive power apparatus, wherein a fluid stored under pressure is utilized to drive the motor, the pressure of the fluid being maintained by a liquid fuel operative device connected therewith.

Another object of the invention is to provide apparatus of the class described, wherein the pressure of the fluid which operates to propel the vehicle is utilized to regulate and control the mechanical connection between the vehicle propelling mechanism and the liquid fuel driven motor, as well as the supply of the liquid fuel to the latter.

A further object of the invention is to provide new and improved means for regulating the flow of fluid under pressure to the vehicle propelling mechanism, as well as for controlling the direction of rotation of the vehicle driving means, thereby controlling the direction of travel of the vehicle.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings wherein is illustrated a preferred embodiment of my invention:

Figure 1:
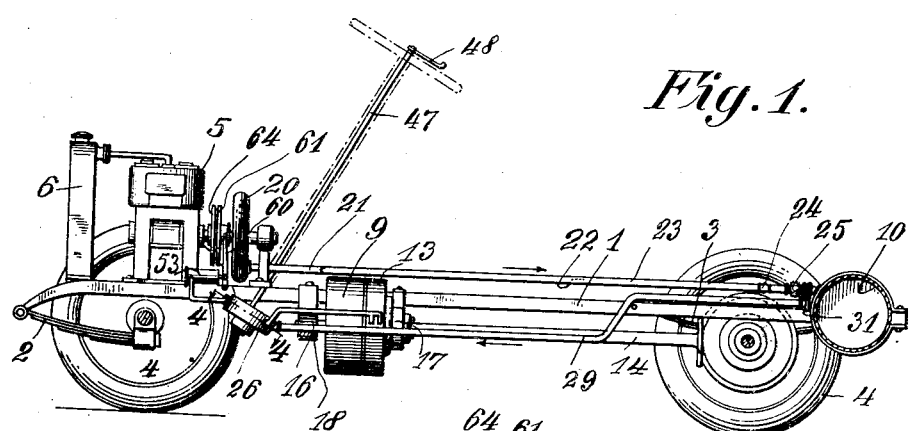
Figure 1 is a view in elevation of the frame of a motor vehicle having my improved mechanism mounted thereon.
Figure 3:
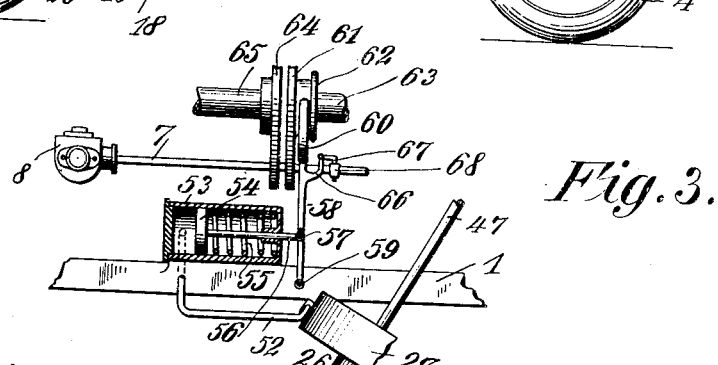
Fig. 3 is a view in elevation on an enlarged scale showing the control mechanism.
Figure 2:
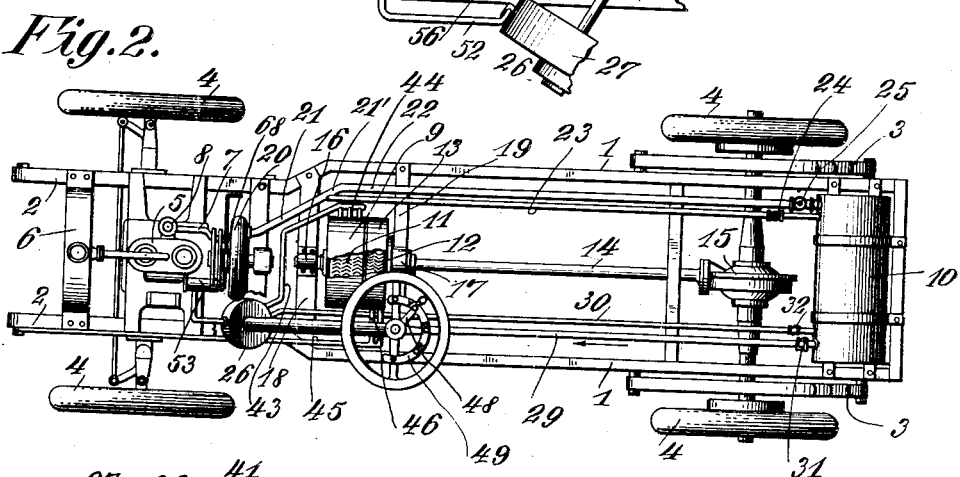
Fig. 2 is a top plan view of the mechanism illustrated in Fig. 1.

Referring now to the drawings, wherein similar reference characters refer to similar parts throughout the several views thereof, the reference numeral 1 denotes the frame or chassis of a motor vehicle, such as an automobile, or a motor truck, which may be of usual construction, and which is supported by the usual spring supports indicated at 2 and 3 upon the road wheels 4. 5 indicates a liquid fuel operated motor having the usual cooling system or radiator 6, the fuel supply for the motor being delivered through the usual conduit 7, and carbureter 8, conduit 7 being, of course, connected with a suitable source of fuel supply (not shown). Reference numeral 9 denotes a motor which is adapted to be driven by a fluid under pressure, such as compressed air, a source of supply of the latter being provided in a container or tank 10, located in the present instance on the rear of the vehicle, said tank being of such construction as to enable it to contain a relatively large quantity of fluid, the pressure of which may be maintained at any point required for driving the vehicle.

The motor 9 is preferably of turbine construction, whereby rotary members 11 and 12, inclosed within a casing indicated at 13, are directly connected as by means of a drive shaft 14, with the differential mechanism 15, the latter being adapted to drive the road wheels 4 in the usual manner. The motor 9 is suitably mounted upon the frame of the machine, and bearings 16 and 17 are provided for the rotary driving members thereof on cross pieces 18 and 19 spanning the side frames of the machine. The reference numeral 20 indicates a fluid pressure pump which is adapted to be mechanically connected with the liquid fuel driven motor 5, so that when said pump is driven by said motor it will deliver air under pressure to the supply tank 10, as by means of conduit 21, which is connected as by means of a Y 21' with the conduits 22 and 23, the latter leading to the tank 10. Conduits 22 and 23 may be suitably valved, as at 24 and 25, so that these conduits may be entirely shut off, and if desired check valves may be employed therein, whereby pressure of the fluid in the tank 10 will not be exerted on the pump mechanism when the latter is not in operation.

Figure 4:
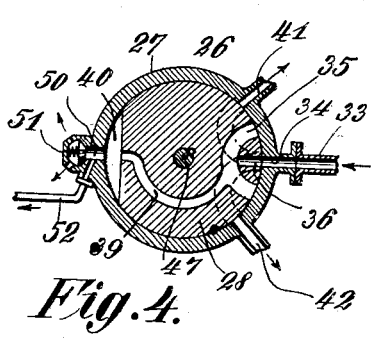
Fig. 4 is a sectional view taken substantially on line IV—IV of Fig. 1.
Figure 5:
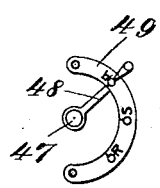
Fig. 5 is a plan view of the control lever.

26 denotes generally a control mechanism which is interposed between the source of fluid pressure supply 10, and the turbine 9, whereby the fluid pressure supply to the turbine may be regulated and controlled, said controlling device comprising preferably a circular casing 27, within which is provided a valve member 28, the latter having a close relative engagement with the interior walls of the casing 27, as clearly shown in Fig. 4 of the drawings.

The fluid under pressure is delivered from the tank 9 to the controlling device 26, through conduits 29 and 30, which may be valved as at 31 and 32, said conduits 29 and 30 being connected as by means of a Y with the conduit 33, which enters the casing 27 through an intake port 34. The valve member 28 is provided with a pass 35, which in the present instance is semi-circular in form, and into which leads a conduit 36, extending through a portion of the valve member 28. Leading from the pass 35, through the valve member 28, is a conduit 39, which leads into a chamber 40. The casing 27 is provided with the exit ports 41 and 42 respectively, the former of which is connected by means of the conduit 43 through the manifold 44 with one end of the casing of the turbine 9, the other of said ports being connected as by means of the conduit 45 through the manifold 46 with the opposite end of the turbine 9. The pass 35 and the valve member 28 are so constructed and of such dimensions that when said valve member is rotated either to the right or left, it will connect the conduit 34 with either of the ports 41 or 42, as indicated by the dotted lines in Fig. 4, whereby the fluid under pressure may be directed into either end of the turbine.

The valve member 28 is operated by means of a shaft 47 keyed thereto, which extends through the casing 27, thence upwardly along the steering wheel shaft, the same terminating in an operating lever 48, which coöperates with a suitable dial 49. From the chamber 40 which is provided between one edge of the valve member 28 and the interior wall of the casing 27, leads a port 50, which connects with a safety valve device 51. It will be seen that the dimensions of the chamber 40 are such that it is always in communication with said conduit so that any excess pressure of the fluid in the supply tank 10 will at all times be taken care of by the safety valve.

Leading from the port 50 is a conduit 52, which leads into a cylinder 53 and behind a piston 54 therein, said piston being urged against the pressure of the fluid in the cylinder by means of a spring 55 which is interposed between the piston and the opposite ends of said cylinder. The piston 54 is provided with a piston rod 56, which is pivotally connected at 57 with a lever 58 pivoted at 59 upon a suitable support. Lever 58 at its upper end is provided with a shifting fork 60, which straddles a part of a friction clutch member 61, said shifting fork being interposed between said clutch member and a collar 62. Clutch member 61 is mounted upon a shaft 63, which drives the pump 20.

Located in opposed relation to the clutch member 61 is a clutch member 64 mounted upon the shaft 65, which is driven by the motor 5. The clutch member 61, while keyed to the shaft 63, is adapted to slide thereon, so that when the lever 58 is operated, as will presently be described, the engagement of the clutch members 61 and 64 will operatively connect the pump 20 and the motor 5.

It will be noted that the fluid pressure supply tank 10 is at all times connected with a cylinder 53 by means of the valve device 26, the parts being so adjusted that whenever the pressure in the tank 10 falls below a certain amount the spring 55 will move the piston 54 inwardly, causing the lever 58 to engage the clutch members 61 and 64, whereby an upward connection will be established between the motor 5 and the pump. Upon the rising pressure in the fluid supply tank 10 above a certain amount, the piston 54 moving in the opposite direction under the pressure will disengage the clutch members 61 and 64, whereby the connection between the motor 5 and the pump 20 will be broken.

Lever 58 is provided with an arm 66, which connects with the valve stem 67 of a valve 68 provided in the conduit 7, which supplies the liquid fuel to the carbureter 8, the parts being so adjusted that when the clutch members 61 and 64 are moved out of engagement with each other the supply of gas will be practically cut off from the conduit 7 to the carbureter 8, it being understood that only a sufficient quantity of liquid fuel will be permitted to pass through the carbureter into the motor 5 as will maintain the same in operation.

It will be seen that the fluid pressure in the cylinder 53 automatically controls the connection between the motor 5 and the pump 20, as well as the supply of fuel to the motor 5.

Having thus described this embodiment of my invention, the operation thereof will now be understood.

It is intended, of course, that a sufficient pressure of air should be maintained at all times in the air reservoir or tank 10 to operate the turbine 9, it being understood that the motor 5 will be utilized to operate the pump 20, whereby the fluid pressure in the reservoir 10 will be maintained at all times at the required degree of pressure, the connection between the motor 5 and the pump 20 being automatically controlled by the fluid pressure which has already been described, and the quantity of fuel supply to the motor being likewise automatically controlled. The valve member 28 which is operated from the steering wheel may be manipulated not only to determine the quantity of fluid to be discharged through the turbine but also the direction of flow therethrough, whereby the speed as well as the direction of the vehicle may be conveniently regulated.

As many changes could be made in this construction without departing from the scope of the following claims, it is intended that all matter contained in the above description or shown in the accompanying drawing shall be interpreted as illustrative only and not in a limiting sense.

Having thus described my invention what I claim as new and desire to secure by Letters Patent is:

1. In an apparatus of the class described, the combination with the propelling means of a vehicle, of a fluid pressure operated motor connected therewith, a reservoir adapted to contain the fluid under pressure connected with said motor, manually controlled means for controlling the amount of fluid under pressure to be delivered to said motor as well as for controlling the direction of flow thereof, whereby said motor may be driven in different directions, a liquid fuel driven motor, pumping means driven by the latter and interposed between the same and said fluid pressure reservoir, and means operated by the pressure of the fluid in said reservoir for controlling the connection between said second named motor and said pumping means and for regulating the quantity of fuel supply to said second named motor.

2. In an apparatus of the class described, in combination with the road wheels of a vehicle, of a fluid pressure driven motor having a driving connection therewith through the usual differential, a reservoir adapted to contain the fluid under pressure operatively connected with said motor, valve mechanism interposed in the connections of said reservoir with said motor, means for operating said valve mechanism whereby the direction of flow of the fluid under pressure to said motor may be controlled and regulated as well as the pressure thereof, a liquid fuel driven motor, a pump adapted to be driven thereby connected with said reservoir, clutch mechanism interposed between said second named motor and said pump, and means operated by the pressure of the fluid in said reservoir adapted through said clutch to connect or disconnect said second named motor therefrom.

3. In an apparatus of the class described, in combination with the road wheels of a vehicle, of a fluid pressure driven motor having a driving connection therewith through the usual differential, a reservoir adapted to contain the fluid under pressure operatively connected with said motor, valve mechanism interposed in the connection of said reservoir with said motor, means for operating said valve mechanism whereby the direction of flow of the fluid under pressure to said motor may be controlled and regulated as well as the pressure thereof, a liquid fuel driven motor, a pump adapted to be driven thereby connected with said reservoir, clutch mechanism interposed between said second named motor and said pump, and means controlled by the pressure of the fluid in said reservoir adapted through said clutch mechanism to connect and disconnect said second named motor therefrom and simultaneously to regulate the flow of liquid fuel to said motor.

4. In an apparatus of the class described, the combination with the road wheels of a vehicle, of a fluid pressure operated motor connected therewith, a reservoir for supplying fluid under pressure to said motor, valve mechanism interposed between said reservoir and said motor and adapted to regulate the supply of fluid under pressure to the latter as well as the direction of flow of said fluid thereto, manually controlled means for operating said valve mechanism, a liquid fuel operated motor, means adapted to be driven thereby for maintaining the pressure of the fluid in said reservoir, a clutch interposed between said fuel driven motor and said last named means, and means connected with said valve mechanism and actuated by the pressure of the fluid in said reservoir adapted to determine the operation of said clutch as well as to determine the amount of liquid fuel delivered to said second named motor.

In testimony whereof I affix my signature in the presence of two witnesses.

DAVID KRAUS.

Witnesses:
 EMMA WEINBERG,
 HELEN CAREY.